G. V. SHEPARD.
COTTER PIN EXTRACTOR.
APPLICATION FILED AUG. 28, 1919.
1,355,174.
Patented Oct. 12, 1920.
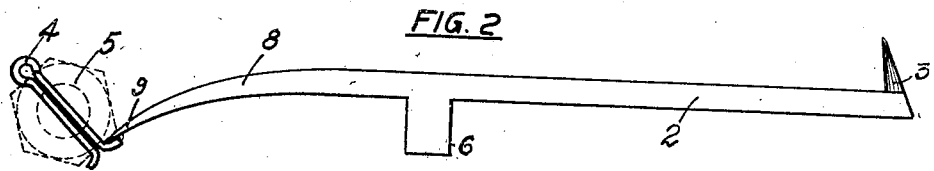
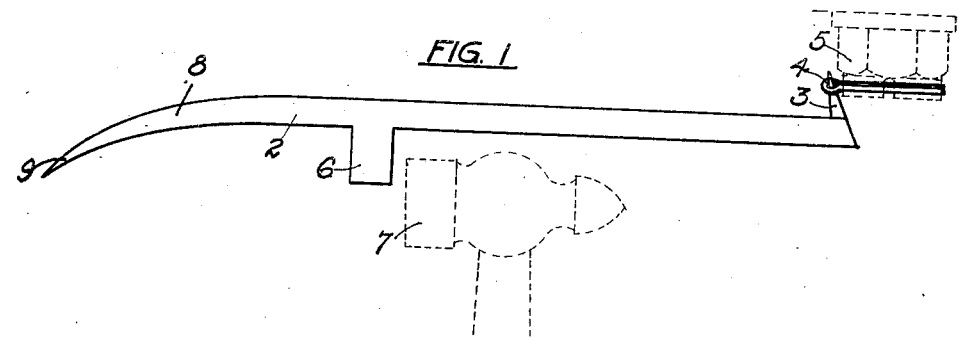
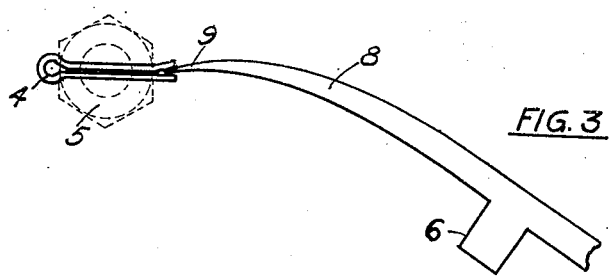
INVENTOR.
G. V. Shepard
BY
ATTORNEY.

UNITED STATES PATENT OFFICE.

GEORGE V. SHEPARD, OF ELMWOOD, CONNECTICUT.

COTTER-PIN EXTRACTOR.

1,355,174.  Specification of Letters Patent.  Patented Oct. 12, 1920.

Application filed August 28, 1919. Serial No. 320,347.

*To all whom it may concern:*

Be it known that I, GEORGE V. SHEPARD, a citizen of the United States, residing at Elmwood, in the county of Hartford and State of Connecticut, have invented certain new and useful Improvements in Cotter-Pin Extractors, of which the following is a specification.

This invention relates to a cotter-pin extractor. I provide an implement of the character set forth which is exceedingly strong, capable of inexpensive construction, easy to operate, and by which a cotter pin can be quickly and readily removed. At the present time the taking out of a cotter pin is an exceedingly troublesome and time-requiring operation. By virtue of my implement these objections are overcome. The implement has in addition, means of an effective nature by which the legs or branches of a cotter pin can be caused to approach each other if necessary, to facilitate its removal, and by which also these legs or branches can be bent back to more securely retain the cotter pin in place against accidental removal. The device possesses other features of novelty and advantage which with the foregoing will be stated at length in the following description, wherein I will outline in detail that one of the several forms of embodiment of the invention which I have selected for illustration in the drawings accompanying and forming part of the present specification. It will be clear that I am not restricted to this particular disclosure. I may in fact depart therefrom in several respects within the scope of the invention defined by the claim following said description.

Referring to said drawings:

Figure 1 shows the implement in position for withdrawing a cotter pin from a bolt and its nut.

Fig. 2 shows the implement in position for straightening out the branches of a cotter pin.

Fig. 3 shows a portion of the rear end of the implement representing it positioned to condition a cotter pin to assume its operative position.

Like characters refer to like parts throughout the several views which are on different scales.

A cotter-pin extractor involving the invention, comprises a shank provided with a hook to enter the eye of a cotter pin, the shank being furnished with means to facilitate its endwise movement, for instance and desirably through the agency of a hammer or other instrument capable of striking a blow. For this purpose I prefer that the shank to which I have referred, have a surface which I might consider as a hammer-engageable surface to be struck by the hammer to impart the necessary blow or force to the shank to withdraw the cotter pin from place. This striking surface as I have broadly considered it, might obviously be of any suitable nature. I prefer although I am not restricted in this regard, that it take the form of a projection from the shank. I might also add that desirably the hook as I have considered it, extends from the shank oppositely to this projection. The hook is preferably of taper form its maximum diameter being at its base and its pointed end being of comparatively small size by virtue of which the hook is adapted to enter the eyes of various size cotter pins. I prefer also that the tail portion of the shank be of such form that it can enter readily between the legs or branches of a cotter pin to bend the same back. This tail portion of the cotter pin also can when necessary, straighten such legs or branches to facilitate the withdrawal of the pin. With the foregoing observations I will now refer more in detail to the structure which I have selected for illustration, not being limited as will be clear, in this particular.

The shank shown is denoted by 2 and it may be of tool steel or other suitable material. At the head end as shown there extends from the shank, the hook 3 practically conical in form, the front of the hook being upon a knife edge. This knife edge converges with the rear face of the hook, at the point or apex thereof, the rear edge of the hook being at right angles to the shank. By reason of this condition which is one way of securing the result, the hook can enter a small eye or a large eye of a cotter pin or any one within the range of size of the hook. The hook is as shown, at the extreme front end of the shank 2 and the front inclined surface merges into the inclined front edge of the shank as shown clearly in both Figs. 1 and 2.

In action this hook is introduced into the eye of a cotter pin 4 which projects through an opening in the nut 5 and also through a registering opening in the bolt of said nut. When the hook is introduced in such an eye and when the shank is given an endwise or longitudinal movement, toward the left in Fig. 1 for instance, the cotter pin can be withdrawn. This movement as I have already observed is preferably accomplished through the agency of a hammer. The shank 2 as shown is provided between its ends with a projection 6 which extends from the shank oppositely from the hook 3 the latter in fact being on one side for instance the upper side, while the projection 6 is on the lower side. What is shown as the right face of this projection 6 is adapted to be struck a blow as by a hammer 7 as shown in Fig. 1 to give to the implement the necessary longitudinal movement to extract the cotter pin. In Fig. 1 as I have observed the hook 3 has been introduced into the eye of the cotter pin 4 so that the implement may pull the cotter pin from place which is accomplished when the projection 6 is struck for instance by the head of the hammer 7.

The implement has means by which it can expand the branches or legs of the cotter pin and it also has means by which these can be straightened out to respectively render more easy if required, the securing of the cotter pin in position or its withdrawal from place. As shown the tail portion of the shank is upon a curve or bend as 8 the curved portion 8 terminating in a knife edge 9. This knife edge 9 as shown for example in Fig. 2 can be introduced between the bent back branches of the cotter pin 4 and the nut 5 to straighten the same or it can be introduced between the branches as illustrated in Fig. 3 to bend the same back against the nut 5.

I wish again to call attention to the fact that the invention comprises rather broad relations. The extractor as I have considered the tool comprises a part having means to engage the head of a cotter pin and it also has means to be engaged by a suitable implement to impart a blow to the part in question to withdraw the pin. Desirably the engagement between the implement and the cotter pin is an interlocking one involving the head of the pin.

It will be seen that a projection as 6 on a shank as 2 is remote from a hook as 3 so that this projection is thus well adapted to receive a proper blow from a hammer or something of an equivalent nature whereby the hook, which is of progressively variable size, in the eye of a cotter pin, can when the projection is given the necessary blow, instantly withdraw the pin from place.

What I claim is:

A cotter pin extractor comprising a shank provided with a hook of progressively increasing size from its point to its base to thereby adapt the hook to enter the eyes of different size cotter pins, the shank having a surface positioned to receive a blow from an implement to impart an endwise movement conforming approximately to the longitudinal axis of the shank between the surface and the hook to withdraw a cotter pin from place, the surface being separated from the hook an interval sufficient to receive the blow of said implement swinging in the space between said surface and the hook portion of the shank.

In testimony whereof I affix my signature in the presence of two witnesses.

GEORGE V. SHEPARD.

Witnesses:
ALICE V. NYQUIST,
HEATH SUTHERLAND.